United States Patent
Choi et al.

(10) Patent No.: US 7,054,982 B2
(45) Date of Patent: May 30, 2006

(54) FIELDBUS INTERFACE BOARD

(75) Inventors: In-Ho Choi, Suwon (KR); Bong-Chae Moon, Seongnam (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 390 days.

(21) Appl. No.: 10/180,300

(22) Filed: Jun. 27, 2002

(65) Prior Publication Data

US 2003/0097511 A1    May 22, 2003

(30) Foreign Application Priority Data

Nov. 16, 2001    (KR) ............................... 2001-71337

(51) Int. Cl.
    *G06F 13/00*    (2006.01)
(52) U.S. Cl. ................. 710/305; 710/100; 710/260
(58) Field of Classification Search ............. 710/305, 710/260–266, 100
    See application file for complete search history.

(56) References Cited

U.S. PATENT DOCUMENTS

| | | | | |
|---|---|---|---|---|
| 5,980,078 A | * | 11/1999 | Krivoshein et al. ............ 700/1 |
| 6,088,665 A | * | 7/2000 | Burns et al. ................ 702/188 |
| 6,128,689 A | * | 10/2000 | Hassbjer et al. ............ 710/305 |
| 6,215,907 B1 | * | 4/2001 | Kumar et al. ................ 382/240 |
| 6,304,934 B1 | | 10/2001 | Pimenta et al. |
| 6,564,268 B1 | * | 5/2003 | Davis et al. .................. 710/11 |
| 6,633,782 B1 | * | 10/2003 | Schleiss et al. .............. 700/26 |
| 6,775,707 B1 | * | 8/2004 | Bennett et al. ............. 709/233 |

* cited by examiner

*Primary Examiner*—Rehana Perveen
*Assistant Examiner*—Kim T. Huynh
(74) *Attorney, Agent, or Firm*—Staas & Halsey LLP

(57) ABSTRACT

An apparatus and method including a fieldbus interface board connected to a fieldbus line. The fieldbus interface board includes a main control unit controlling an overall operation of the board. A main memory inputs and outputs data required for the operation of the main control unit, wherein the main control unit controls the main memory. A fieldbus control unit controls transmission and reception of fieldbus data. A buffer memory buffers the fieldbus data to be transmitted to the fieldbus line or to be received from the fieldbus line. A fieldbus access unit transmits the fieldbus data to the fieldbus line or receives the fieldbus data from the fieldbus line, wherein the fieldbus control unit controls the buffer memory and the fieldbus access unit.

2 Claims, 11 Drawing Sheets

FIELDBUS INTERFACE BOARD

CROSS-REFERENCE TO RELATED APPLICATIONS

This application claims the benefit of Korean Application No. 2001-71337, filed Nov. 16, 2001, in the Korean Intellectual Property Office, the disclosure of which is incorporated herein by reference.

BACKGROUND OF THE INVENTION

1. Field of the Invention

The present invention relates to a fieldbus interface board that can improve communication efficiency.

2. Description of the Related Art

Currently, fieldbus interface technology is developed to enable interfacing of digital serial communication controlling control devices, sensors, actuators, etc., in a field of control in factory automation.

FIG. 1 is a block diagram showing a conventional fieldbus interface board. Referring to FIG. 1, the conventional fieldbus interface board includes a microcontroller 1 having a ROM 1a to store an information exchange program and input/output ports. The microcontroller 1 outputs an address to store information and an address latch enable signal ALE. The interface board further includes latches 2 and 2a to separate a lower byte address LOW ADDR and a higher byte address HIGH ADDR inputted to the microcontroller 1, in response to the address latch enable signal ALE, and to maintain the separated addresses for a certain period of time. A first decoder 5 deciphers the addresses LOW ADDR and HIGH ADDR from the latches 2 and 2a and outputs a chip selection signal CS to a chip selection terminal of a system RAM 3 or a dual port RAM 4. A bi-directional first bus transceiver 6 transmits lower byte data LOW DATA inputted to the microcontroller 1 to the system RAM 3 and the dual port RAM 4. A bi-directional second bus transceiver 6a transmits higher byte data HIGH DATA inputted to the microcontroller 1 to the system RAM 3 and the dual port RAM 4. A Manchester encoder/decoder 9 is provided to Manchester-encode data inputted and decode Manchester-encoded data, and first and second latch/shift registers 7 and 8 are provided, each connected to the system RAM 3, the dual port RAM 4, and the Manchester encoder/decoder 9. An interface 10 interfaces data exchanged between the Manchester encoder/decoder 9 and a fieldbus (not shown). A Cyclic Redundancy Checking (CRC) device 11 checks data errors, and a personal computer interface 12 exchanges data with a computer (not shown).

The conventional fieldbus interface board functions to control an operation of the interface board and fieldbus communication through the microcontroller 1. Accordingly, the microcontroller 1 controls both the operation of the interface board and fieldbus communication at the same time, so the construction of the interface board is complicated and a processing speed of the interface board is reduced owing to an amount of data to be processed.

Additionally, the conventional fieldbus interface board is problematic in that different types of data being inputted and outputted are not distinguished from one another, thereby causing difficulty with high-speed control.

SUMMARY OF THE INVENTION

Various objects and advantages of the invention will be set forth in part in the description that follows and, in part, will be obvious from the description, or may be learned by practice of the invention.

Accordingly, the present invention has been made keeping in mind problems occurring in the conventional fieldbus interface board, and an object of the present invention is to provide a fieldbus interface board that can improve communication efficiency.

In order to accomplish the above and other objects, the present invention provides a fieldbus interface board connected to a fieldbus line, the fieldbus interface board including: a main control unit controlling an overall operation of the board; a main memory inputting and outputting data required for the operation of the main control unit, wherein the main control unit controls the main memory; a fieldbus control unit controlling transmission and reception of fieldbus data; a buffer memory buffering the fieldbus data to be transmitted to the fieldbus line or to be received from the fieldbus line; and a fieldbus access unit transmitting the fieldbus data to the fieldbus line or receiving the fieldbus data from the fieldbus line, wherein the fieldbus control unit controls the buffer memory and the fieldbus access unit.

The present invention is also achieved by a method of a data write process of a main control unit in a fieldbus interface board connected to a fieldbus line, including: initializing a data length index; initializing head and tail indices representing an increase and a decrease, respectively, of a number of messages in a queue; storing data to be transmitted in the queue according to a priority of the data; increasing a head index of the queue by a predetermined number; and determining whether the head index of the queue is equal to a preset maximum size of the queue, wherein when the head index of the queue is equal to the maximum size of the queue, the head index of the queue is initialized, and when the head index of the queue is not equal to the preset maximum size of the queue, or after the head index of the queue is initialized, a data length index is increased allowing a currently stored portion of data being stored to be known.

The present invention is also achieved by a transmission method of a main control unit in a fieldbus interface board including a field bus control unit and connected to a fieldbus line, including: storing data to be transmitted from the main control unit; setting a start pointer of the data to be transmitted and controlled by the main control unit; transmitting a transmission start command from the main control unit to the fieldbus control unit; transmitting the data stored to the fieldbus line; generating an interrupt corresponding to a completion of transmission; and transmitting the interrupt to the main control unit, wherein the main control unit recognizes the completion of transmission, and transmits a signal corresponding to additional data to the fieldbus control unit, when additional data exists.

These together with other objects and advantages, which will be subsequently apparent, reside in the details of construction and operation as more fully hereinafter described and claimed, reference being had to the accompanying drawings forming a part thereof, wherein like numerals refer to like parts throughout.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE PREFERRED EMBODIMENTS

Hereinafter, embodiments of the present invention will be described in detail with reference to the attached drawings.

Figure 1:
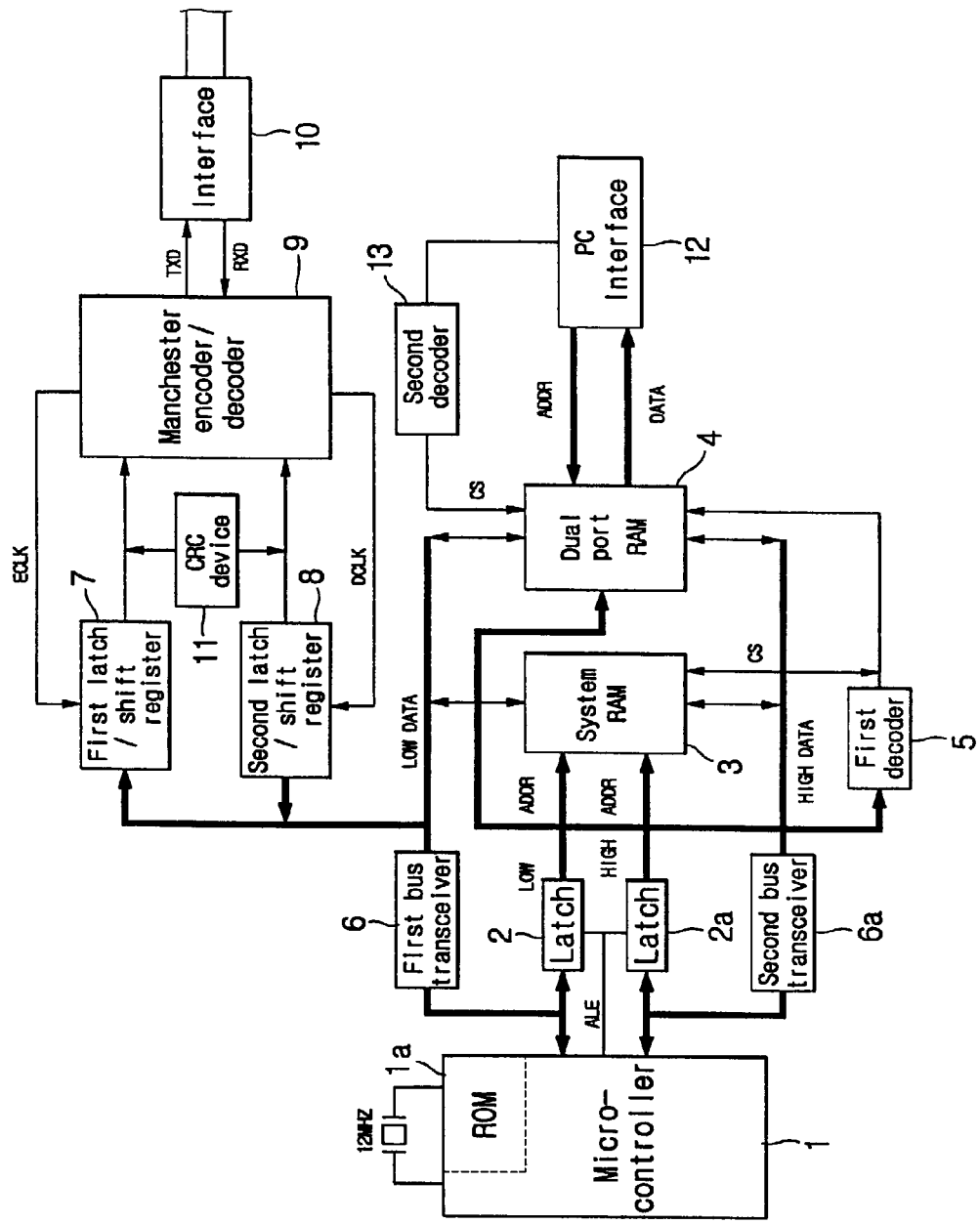
FIG. 1 is a block diagram showing a conventional fieldbus interface board.
Figure 2:
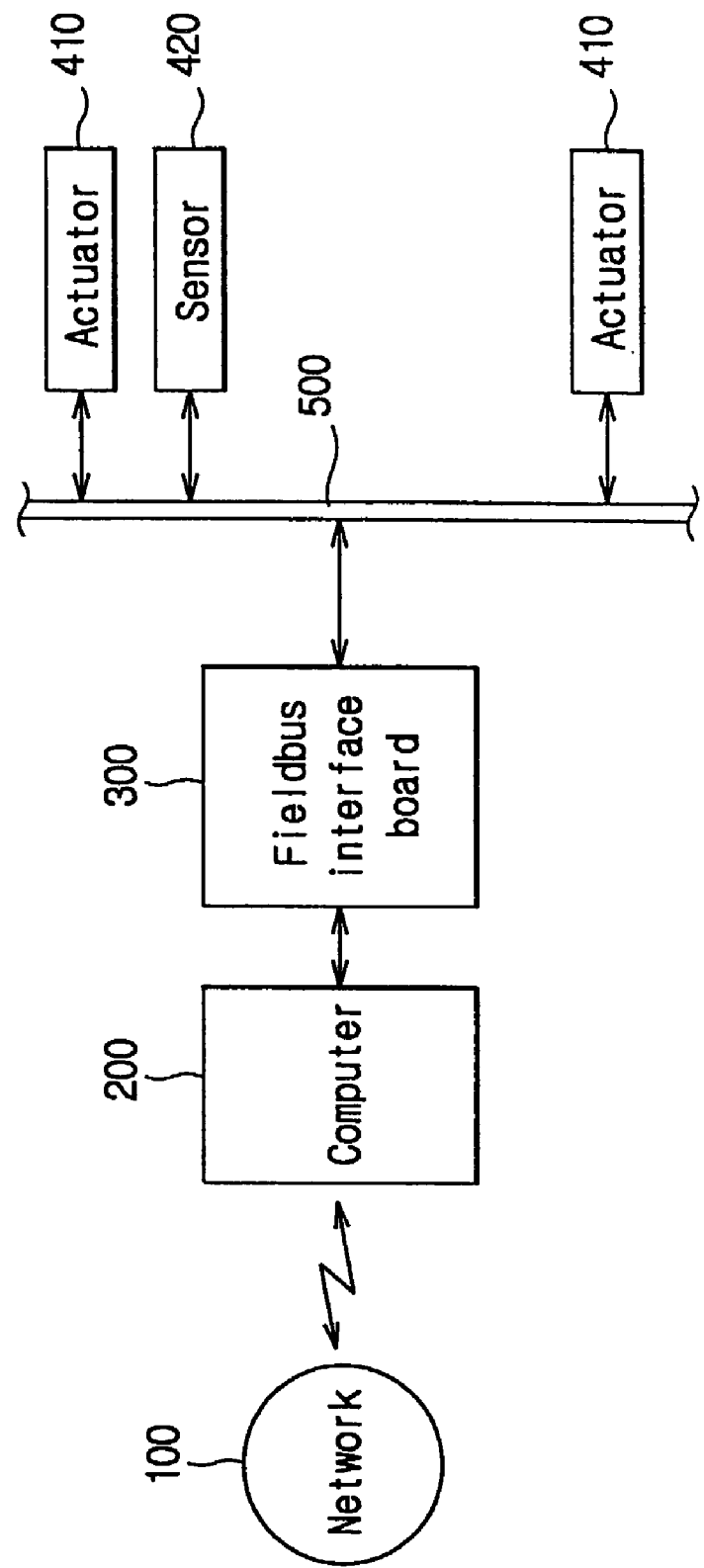
FIG. 2 is a block diagram showing a connection of a fieldbus interface board of the present invention.

FIG. 2 is a block diagram showing a connection of a fieldbus interface board 300 of the present invention. Referring to FIG. 2, a fieldbus interface board 300 of the present invention is mounted on a computer 200, and is connected to a fieldbus line 500 to which a variety of actuators 410 and sensors 420 are connected. The computer 200 on which the fieldbus board 300 is mounted is connected to a network 100 through a network adaptor described later.

Figure 3:
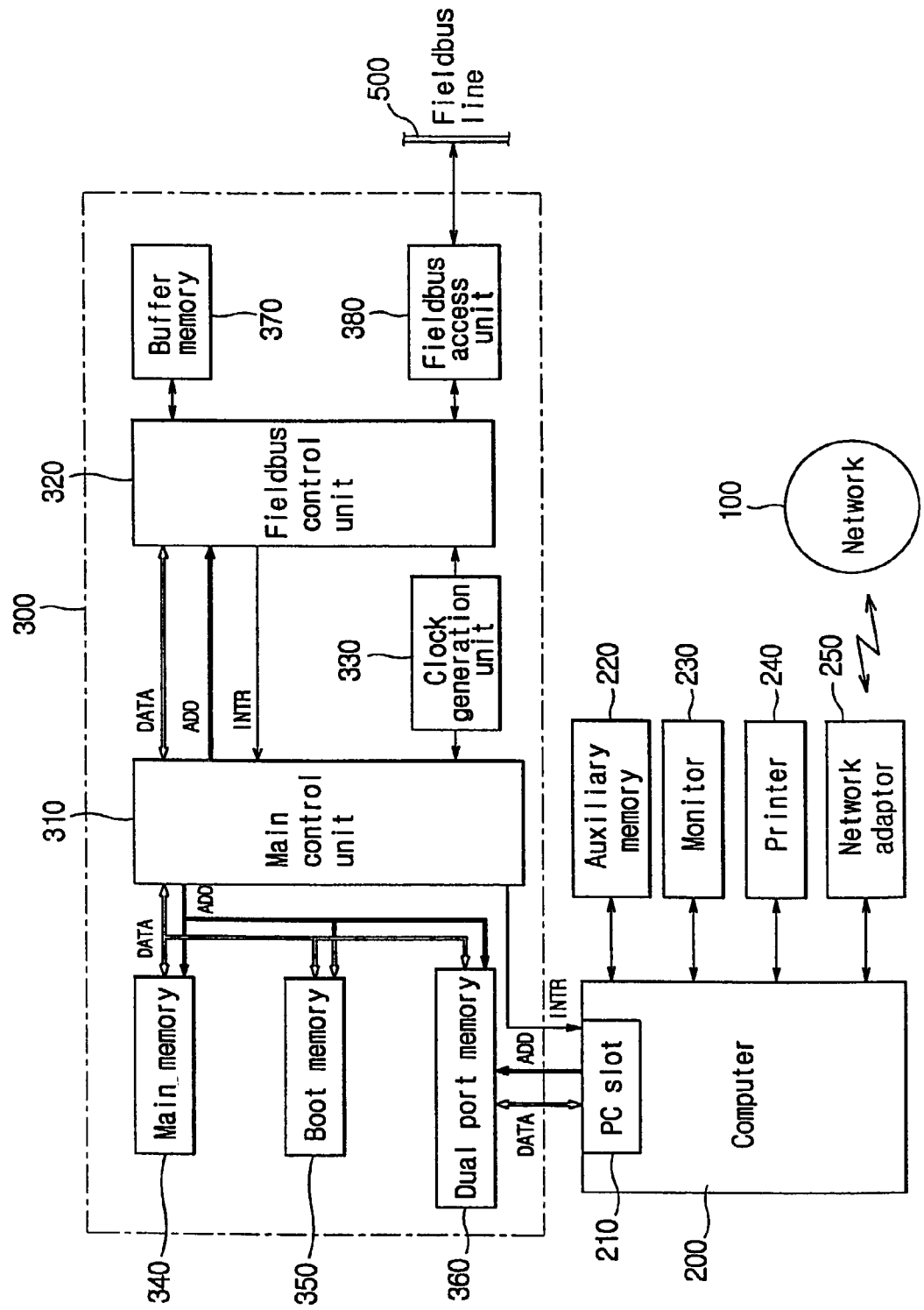
FIG. 3 is a detailed block diagram showing the fieldbus interface board of the present invention.

FIG. 3 is a detailed block diagram showing the field bus interface board 300 of the present invention. Referring to FIG. 3, the fieldbus interface board 300 includes a main control unit 310 controlling an overall operation of the interface board 300 and a fieldbus control unit 320 controlling transmission and reception of fieldbus data.

The fieldbus interface board 300 of the present invention includes a clock generation unit 330 supplying clock signals to the main control unit 310 and the fieldbus control unit 320, a main memory 340 processing data required for the operation of the main control unit 310, a boot memory 350 storing a drive program for the main memory 310, and a dual port memory 360 to share data between the computer 200 and the main control unit 310. The fieldbus interface board 300 further includes a buffer memory 370 buffering data to be transmitted to the fieldbus line 500 or to be received from the fieldbus line 500 under the control of the fieldbus control unit 320 and a fieldbus access unit 380 transmitting data to the fieldbus line 500 or receiving data from the fieldbus line 500 under the control of the fieldbus control unit 320.

In the dual port memory 360, addresses therein are mapped to memory addresses in an operating system of the computer 200 to allow the dual port memory 360 to be shared by the computer 200 and the main control unit 310.

The computer 200 includes a PC slot 210 to which a fieldbus interface board 300 is connected, an auxiliary memory 220 to store an application program required for the control of the operation system and the fieldbus interface board 300, a monitor 230 to visually display information, a printer 240, and an adaptor 250 to access the network 100.

Figure 4:
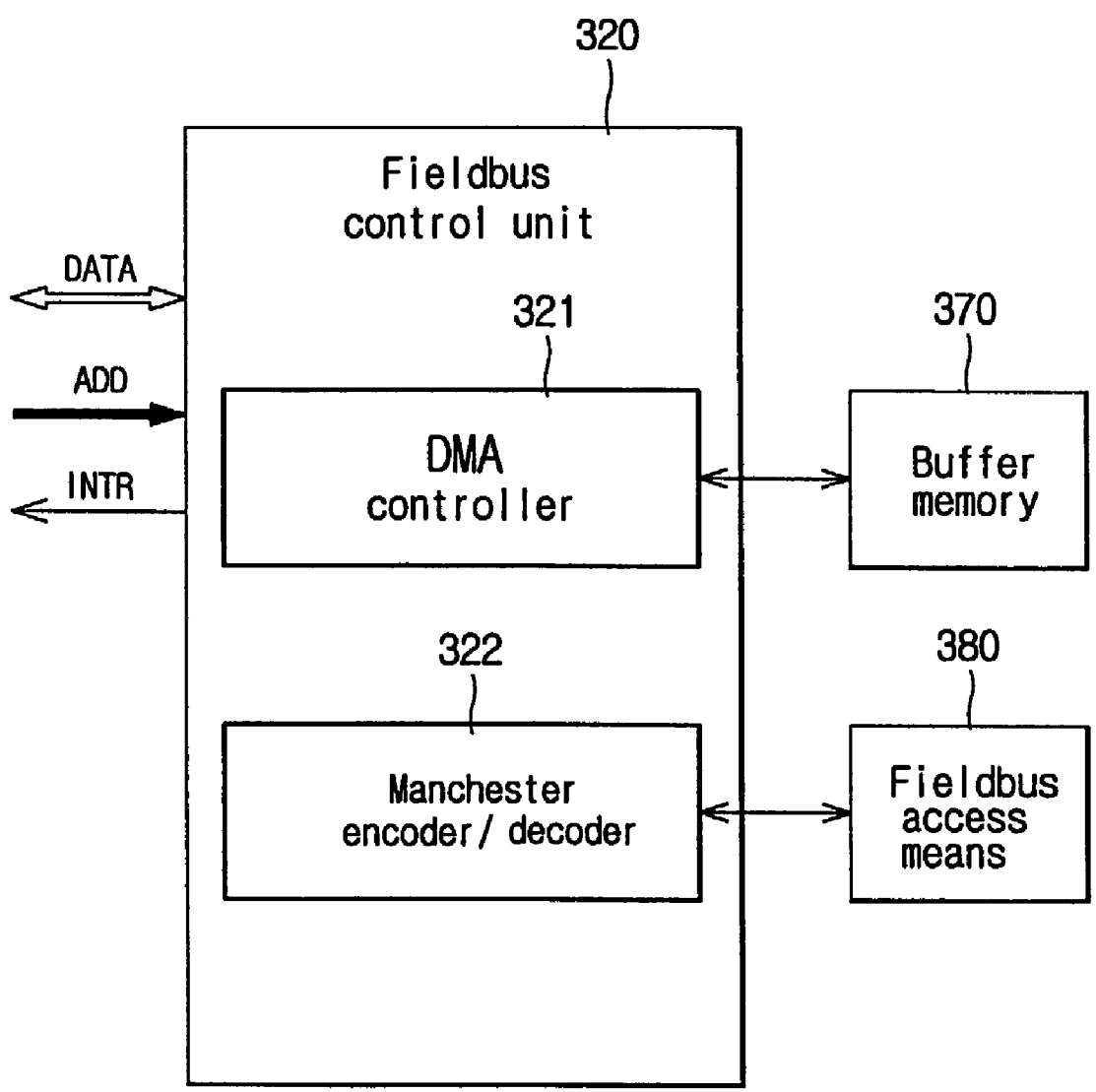
FIG. 4 is a block diagram showing a fieldbus control unit of the fieldbus interface board of the present invention.

FIG. 4 is a block diagram showing the fieldbus control unit 320 of the fieldbus interface board of the present invention. Referring to FIG. 4, the fieldbus control unit 320 of the present invention includes a Direct Memory Access (DMA) controller 321. Accordingly, the fieldbus controller 320 accesses the buffer memory 370 without the control of the main controller 310, thus reducing a load of the main controller 310. Additionally, the fieldbus controller 320 includes a Manchester encoder/decoder 322 to encode data to be transmitted to the fieldbus line 500 and to decode data received from the fieldbus line 500.

Hereinafter, the operation of the fieldbus interface board of the present invention is described.

An application program operating on the operating system of the computer 200 transmits data to a preset memory address of the dual port memory 360. Accordingly, the data is transmitted to a corresponding address of the dual port memory 360 through the PC slot 210 of the computer 200. Therefore, the main control unit 310 of the fieldbus interface board 300 loads the data stored in the dual port memory 360. The main control unit 310 designates an address allocated to the fieldbus control unit 320 in a same way as the main control unit 310 accesses the main memory 340, and transmits the data through a data bus.

Accordingly, the fieldbus control unit 320 recognizes the designated address, and receives the data transmitted through the data bus. In this case, the fieldbus control unit 320 controls the buffer memory 370 through the DMA controller 321 so that the data received through the data bus is stored in the buffer memory 370. After the data is stored in the buffer memory 370, the fieldbus control unit 320 encodes the data through the Manchester encoder/decoder 322, and transmits the encoded data to the fieldbus access unit 380. The data transmitted to the fieldbus access unit 380 is transmitted to the fieldbus line 500.

Meanwhile, the data to be transmitted from the fieldbus line 500, that is, received data, is converted into standardized pulse signals in the fieldbus access unit 380, and transmitted to the fieldbus control unit 320. The fieldbus control unit 320 receives the data transmitted from the fieldbus access unit 380. Additionally, the fieldbus control unit 320 decodes the received data through the Manchester encoder/decoder 322. The DMA controller 321 stores the received data decoded in the buffer memory 370.

The fieldbus control unit 320 generates an interrupt signal INTR. When the interrupt signal INTR is generated in the fieldbus control unit 320, the main control unit 310 designates an address allocated to the fieldbus control unit 320. When the address is allocated, the fieldbus control unit 320 transmits the data stored in the buffer memory 370 to the data bus. Accordingly, the main control unit 310 receives the data transmitted to the data bus, stores the data in the dual port memory 360, and transmits the interrupt signal INTR to the computer 200.

Upon receipt of the interrupt signal, the computer 200 designates the address of the dual port memory 360 and loads the data. Accordingly, the application program processes the data, while the computer 200 displays the processed data on the monitor 230 and outputs the processed data through the printer 240. Additionally, the computer 200 can transmit the processed data to the network 100 through the network adaptor 250.

Figure 5:
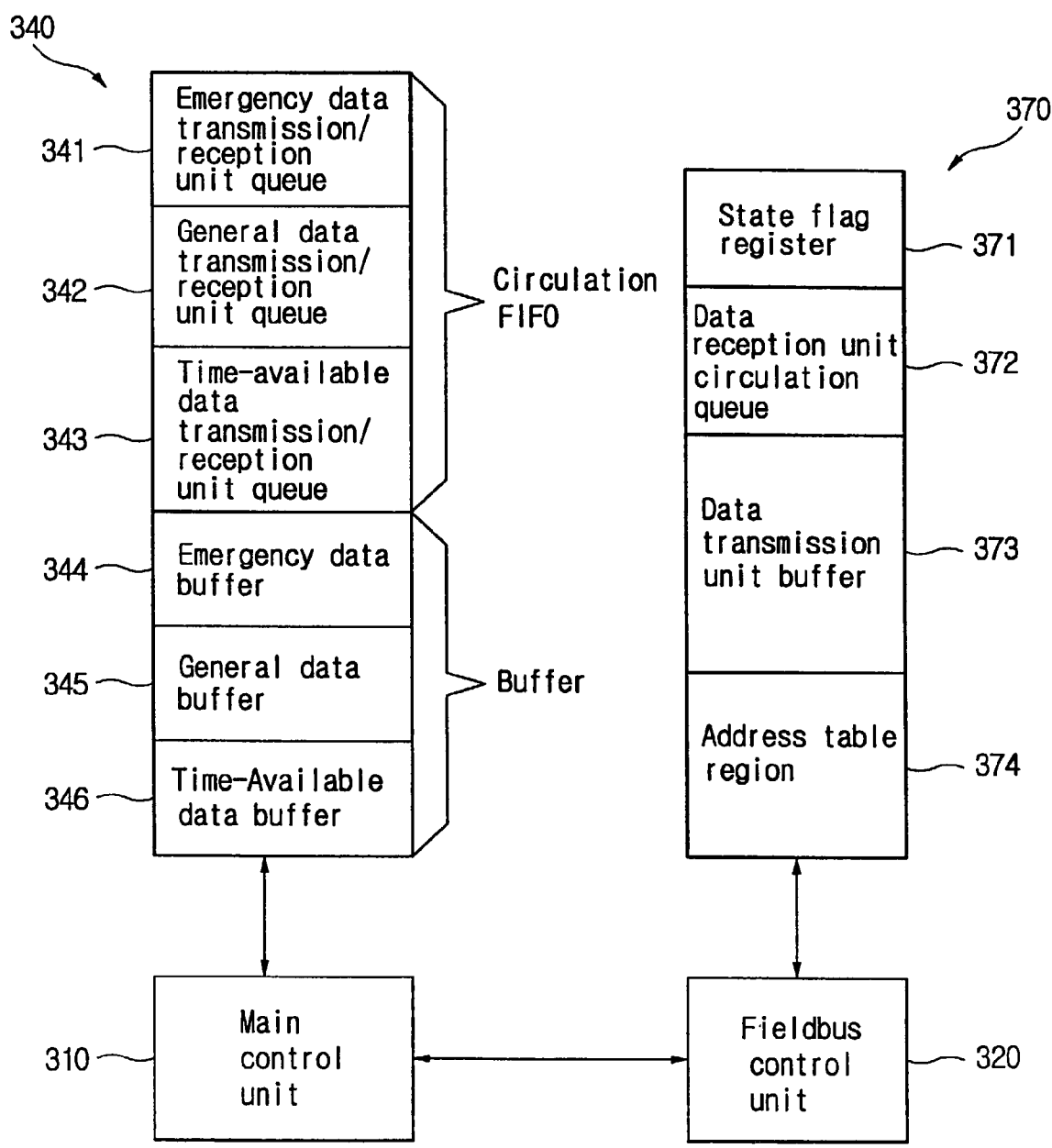
FIG. 5 is a block diagram showing structures of memories of the fieldbus interface board of the present invention.

The memories 340 and 370 of the fieldbus interface board 300 of the present invention have constructions as shown in FIG. 5. Referring to FIG. 5, the main memory 340 is generally divided into a circulation First-In, First-Out (FIFO) queue and a buffer. The circulation FIFO queue is divided into an emergency data transmission/reception unit queue 341, a general data transmission/reception unit queue 342, and a time-available data transmission/reception unit queue 343 according to priorities of the data. The buffer is divided into an emergency data buffer 344, a general data buffer 345 and a time-available data buffer 346, which is a memory area where data periodically updated in the fieldbus network is stored and outputted.

The buffer memory 370 connected to the fieldbus control unit 320 is divided into a state flag register 371, which are areas of control, interrupt, and state registers. A data reception unit circulation queue 372 stores received data, a data transmission unit buffer 373 temporarily stores data when the data is transmitted, and an address table region 374 examines a validity of an address frame required to validate the data received from the fieldbus network.

Figure 6:
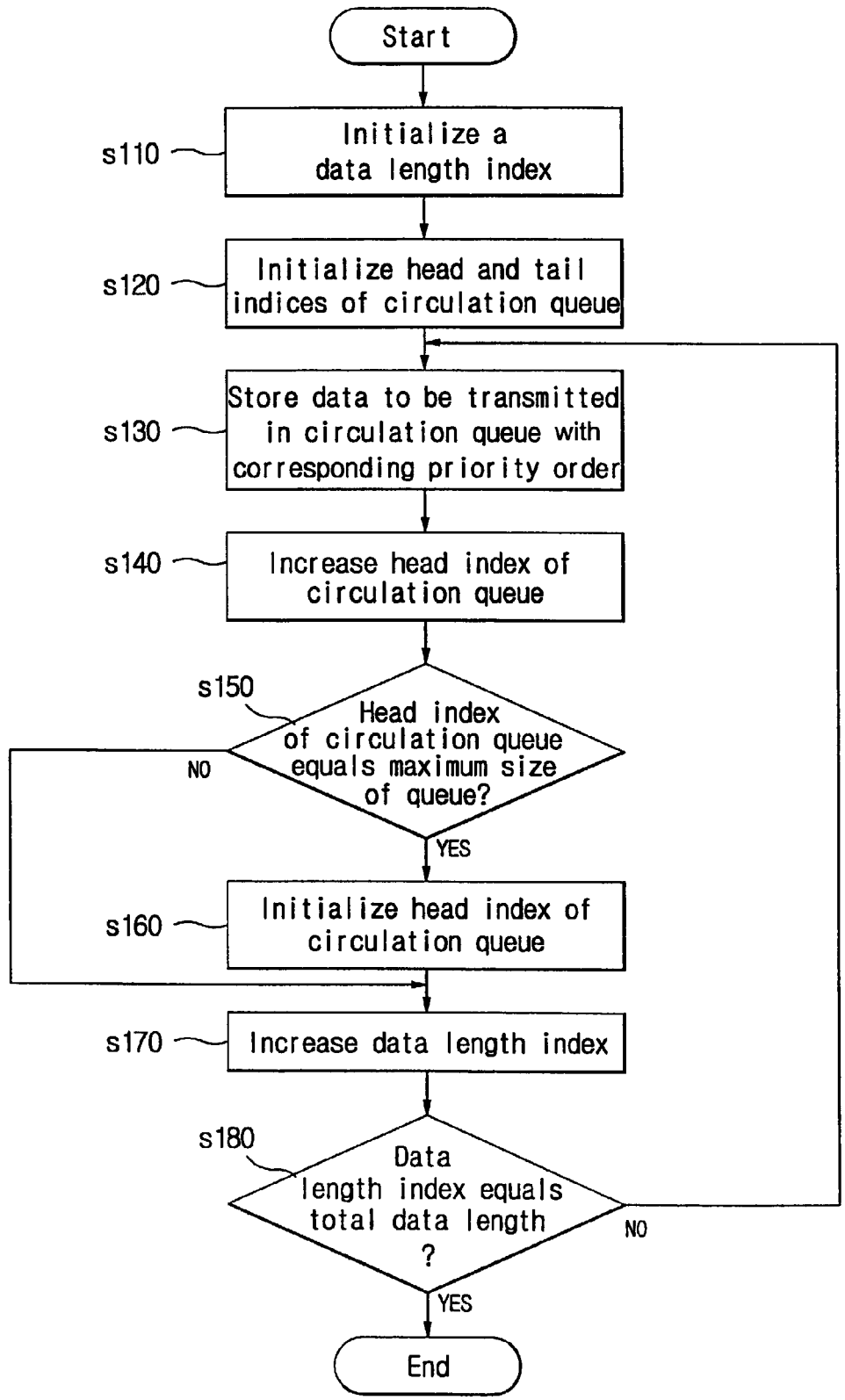
FIG. 6 is a flowchart showing a data write process of a main control unit of the fieldbus interface board of the present invention.

Hereinafter, a control method of the fieldbus interface board 300 of the present invention is described in detail. FIG. 6 is a flowchart showing a data write process of the main control unit of the fieldbus interface board of the present invention. Referring to FIG. 6, at S110, the main control unit 310 initializes a data length index. At S120, the main control unit 310 initializes head and tail indices that represent an increase and a decrease, respectively, in a number of messages in a queue.

At S130, the main control unit 310 stores data to be transmitted in a corresponding queue of the circulation FIFO queue according to a priority of the data. Additionally, at S140, the main control unit 310 increases a head index of the corresponding queue equal to a length of the data. In this case, whenever one byte data is stored, the index is increased by "1".

At S150, because a capacity of the circulation FIFO queue is restricted, the main control unit 310 determines whether the head index of the queue is equal to a preset maximum size of the queue. If, at S150, it is determined that the head index of the queue is equal to the maximum size of the queue, at S160, the head index of the queue is initialized.

At S150, if it is determined that the head index of the queue is not equal to the preset maximum size of the queue, or after the head index of the queue is initialized, at S170, the main control unit 310 increases a data length index. As a result, a currently stored portion of data being stored can be known.

At S180, the main control unit 310 determines whether the data length index is equal to a total data length. If it is determined that the data length index is not equal to the total data length, the main control unit 310 returns to S130. If it is determined that the data length index is equal to the total data length, the main control unit 310 determines that the storage of the data is completed.

Figure 7:
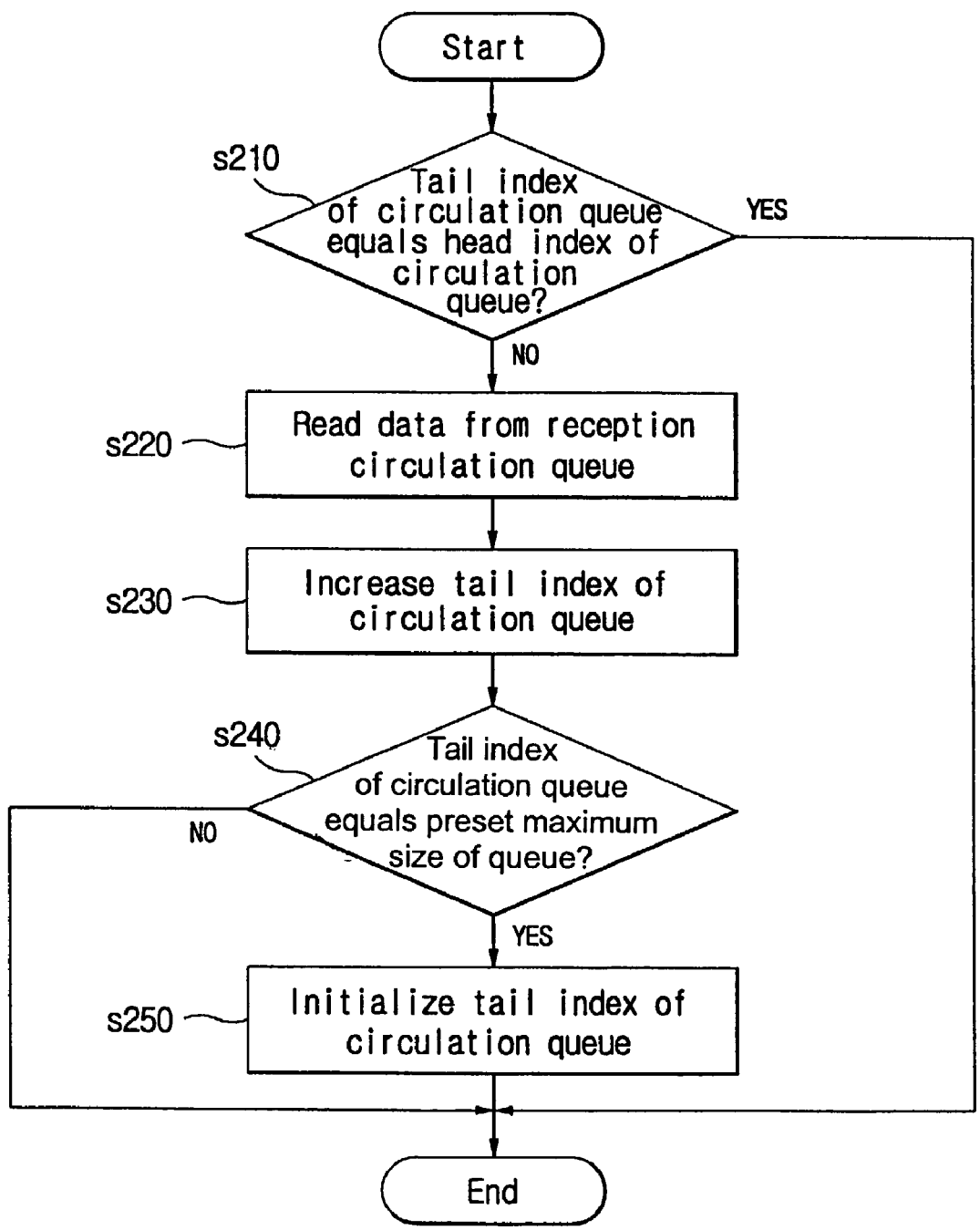
FIG. 7 is a flowchart showing a data read process of the main control unit of the present invention.

FIG. 7 is a flowchart showing a data read process of the main control unit 310 of the present invention. Referring to FIG. 7, the main control unit 310 accesses the reception unit queue 341 of the circulation FIFO queue of the corresponding priority to read data, and, at S210, determines whether a corresponding tail index is equal to the head index.

If it is determined that the tail index is not equal to the head index, at 220, the main control unit 310 reads one byte from the reception unit queue 341 of the corresponding circulation FIFO queue. Additionally, at S230, the main control unit 310 increases the tail index by "1".

Additionally, at S240 the main control unit 310 determines whether the tail index is equal to the preset maximum size of the queue. If it is determined that the tail index is equal to the preset maximum size of the queue, at S250, the main control unit 310 initializes the tail index. If the tail index is not equal to the preset maximum size of the queue, after the tail index is initialized at S250, or if it is determined that the tail index is equal to the head index, the main control unit 310 finishes the read process. The above-described read process is performed for one byte data, and repeating the above-described read process can perform a read process for more than one byte data.

Figure 8:
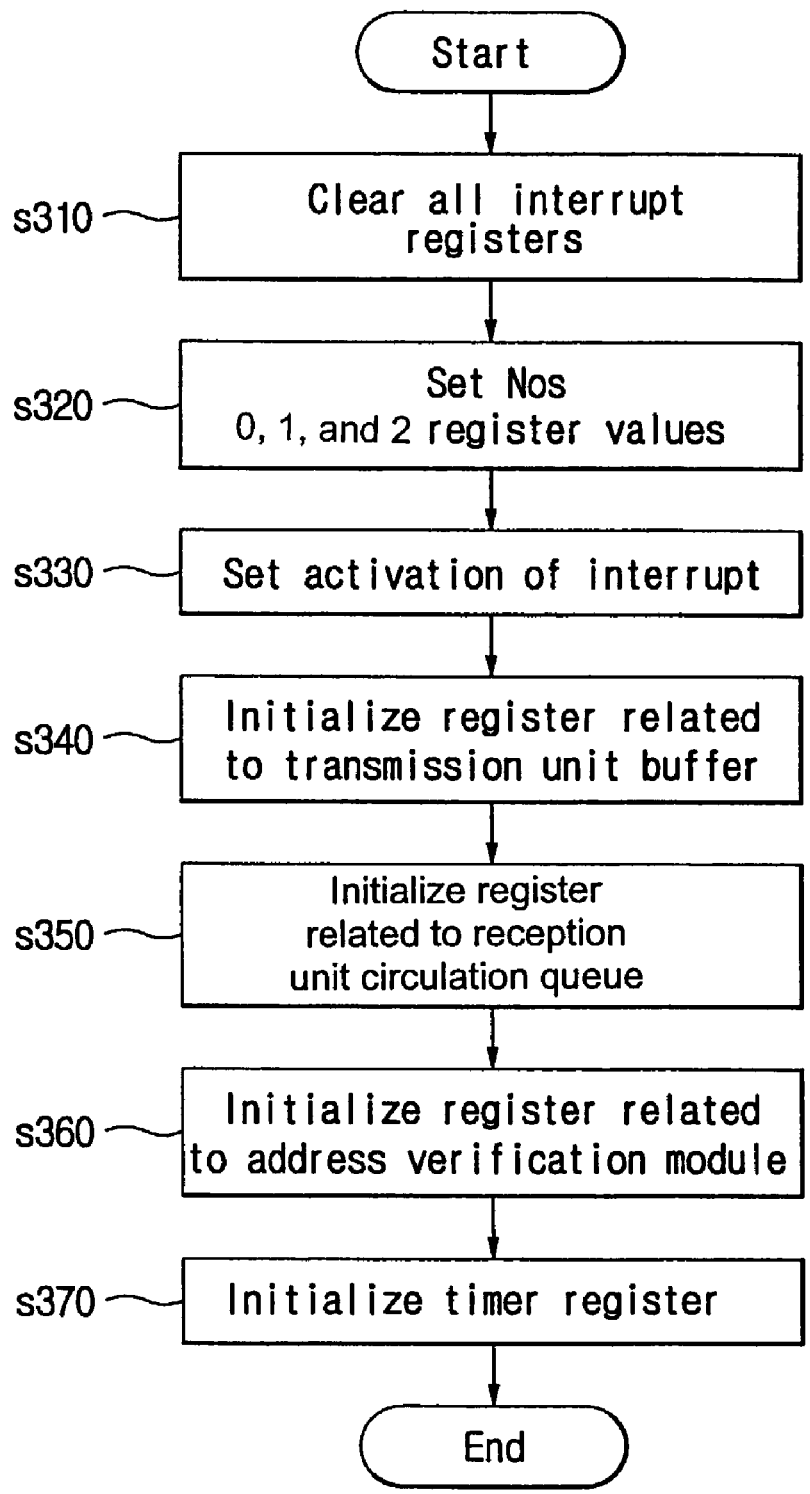
FIG. 8 is a flowchart showing an initialization process of the fieldbus control unit of the present invention.

Further, the main control unit 310 initializes the fieldbus control unit 320 before carrying out fieldbus communication. The initialization is described with reference to FIG. 8. Referring to FIG. 8, at 310 all the interrupt registers are cleared. At S320, fieldbus control unit 320 sets Nos. 0, 1, and 2 control register values to perform a normal network operation, and, at S330, sets desired interrupt registers to be activated. At S340, the fieldbus control unit 320 initializes a register related to the transmission unit buffer 373, and ], at S350, the fieldbus control unit 320 initializes a register related to the data reception unit circulation queue 372. Additionally, at S360, the fieldbus control unit 320 initializes a register related to the address table region 374. At S370, the fieldbus control unit 320 initializes a timer register.

Figure 9:
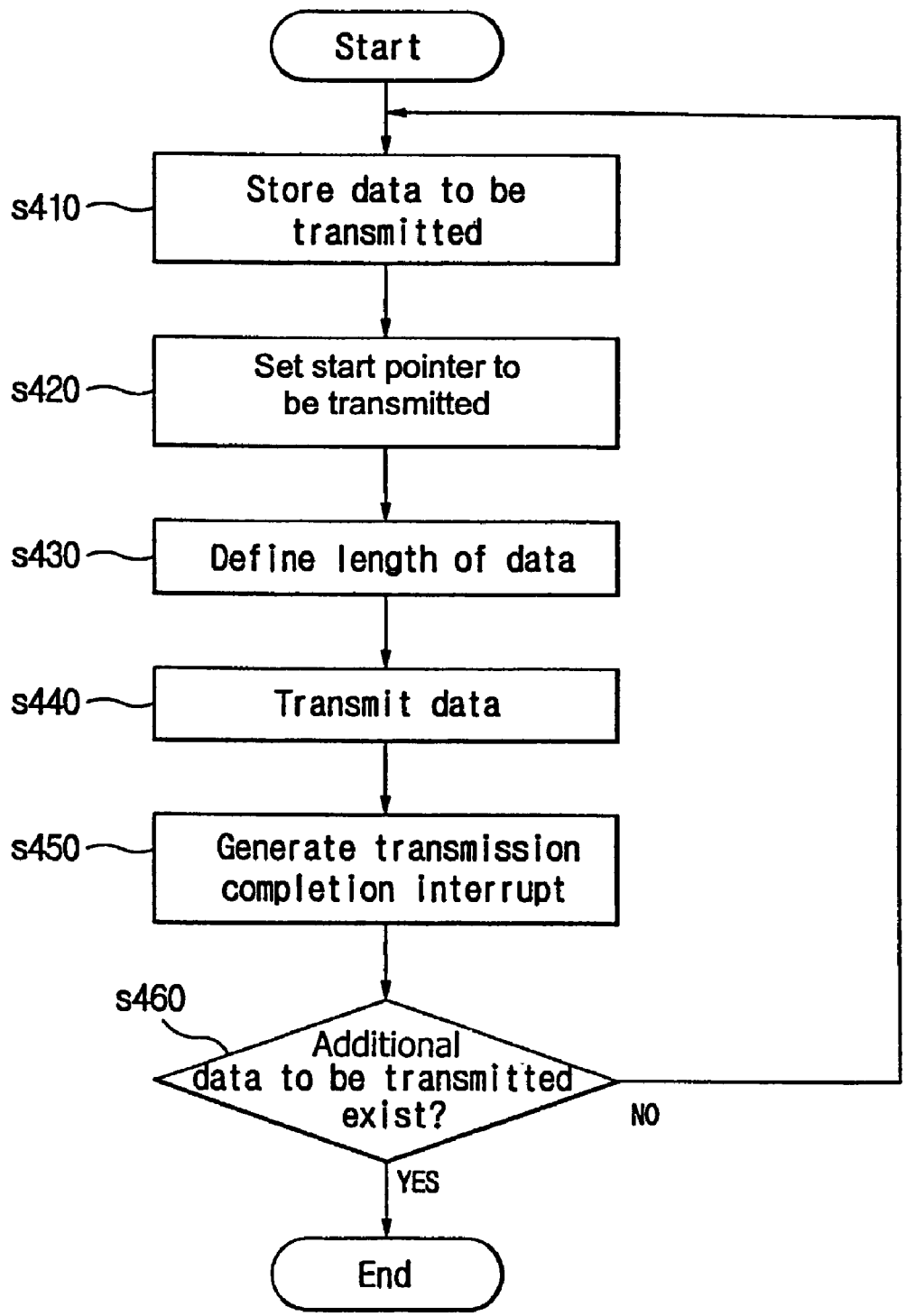
FIG. 9 is a flowchart showing a transmission process of the fieldbus control unit of the present invention.

FIG. 9 is a flowchart showing a transmission process of the fieldbus control unit 320 of the present invention. At S410, fieldbus control unit 320 stores the data to be transmitted from the main control unit 310 in the data transmission unit buffer 373. Additionally, at S420, the fieldbus control unit 320 sets a start pointer of the data to be transmitted through the control of the main control unit 310, and, at S430, defines a length of the data.

When a transmission start command is transmitted from the main control unit 310 to the fieldbus control unit 320, the fieldbus control unit 320 controls the DMA controller 321, so, at S440, the data stored in the data transmission unit buffer 373 of the buffer memory 370 is transmitted to the fieldbus line 500 through the fieldbus access unit 380.

When the transmission of data is completed, the fieldbus control unit 320 generates an interrupt regarding the completion of transmission. The interrupt regarding the completion of transmission is transmitted to the main control unit 310, so the main control unit 310 recognizes the completion of transmission, and transmits a signal corresponding to additional data to the fieldbus control unit 320, if additional data exists.

At 460, the fieldbus control unit 320 determines whether additional data exists based on the signal transmitted from the main control unit 310 after the interrupt regarding the completion of transmission. If it is determined that additional data exists, the fieldbus control unit 320 returns to S410. However, if it is determined that additional data does not exist, the fieldbus control unit 320 finishes the transmission of the data.

Figure 10:
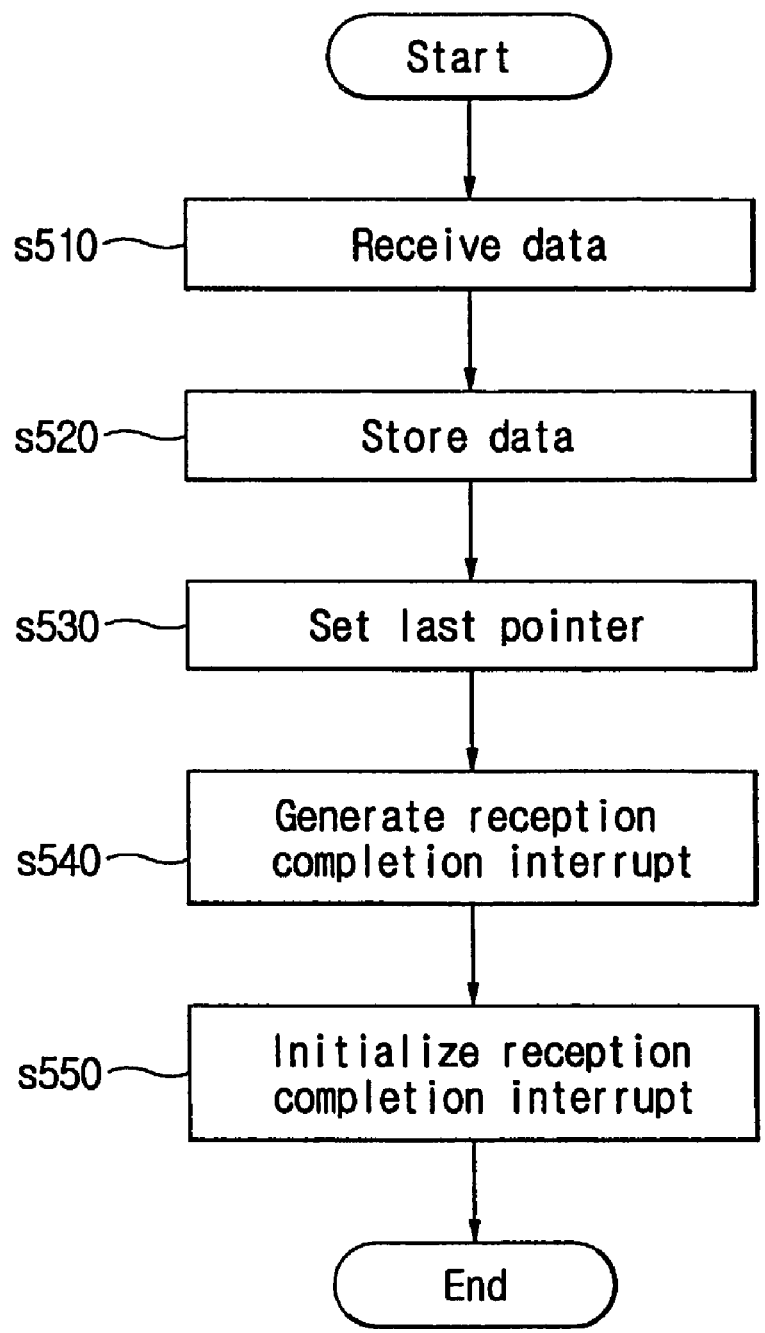
FIG. 10 is a flowchart showing a reception process of the fieldbus control unit of the present invention.

FIG. 10 is a flowchart showing a reception process of the fieldbus control unit 320 of the present invention. If the data is received at S520, the fieldbus control unit 320 stores data received through the DMA controller 321 in the data reception unit circulation queue 372 in the buffer memory 370. At S530, the fieldbus control unit 320 sets a last pointer of data.

If storing the data received is complete, at S540, the fieldbus control unit 320 generates an interrupt corresponding to the completion of data reception. The main control unit 310 recognizes the data reception by the interrupt regarding the completion of the data reception and retrieves the data stored in the data reception unit circulation queue 372 of the buffer memory 370 to the main memory 340.

Figure 11:
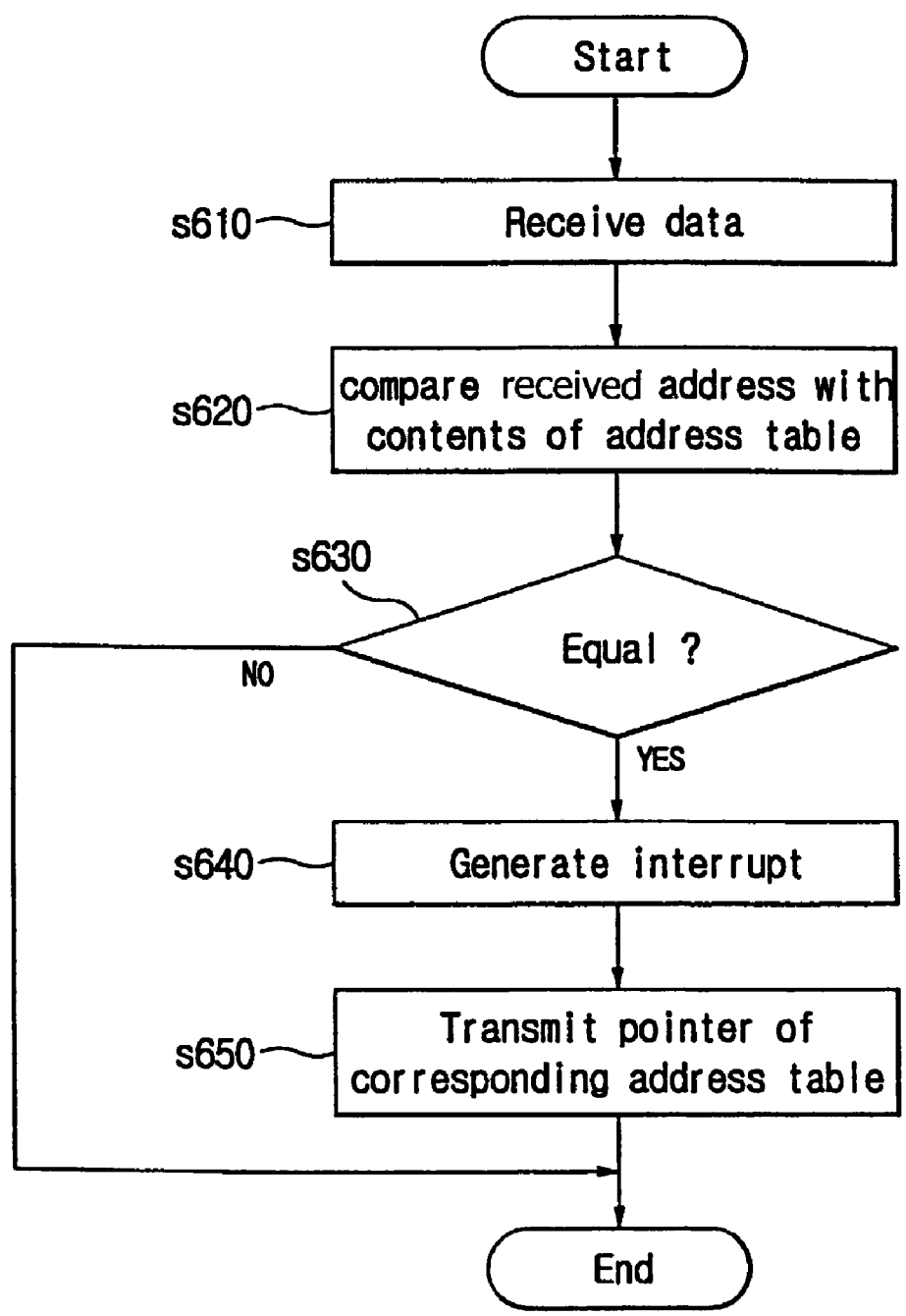
FIG. 11 is a flowchart showing an address verification process of the fieldbus control unit of the present invention.

Additionally, at S550, the fieldbus control unit 320 initializes a register related to the data reception. The fieldbus control unit may verify the address of the data. This process is described with reference to FIG. 11. Referring to FIG. 11, when the data is received, at S620, the fieldbus 320 compares an address stored in the address table region of the buffer memory 370 through the DMA controller 321 with the address of the data received.

At S630, the fieldbus control unit 320 determines whether the addresses coincide with each other. If it is determined that the address of the data received coincides with the address of the address table region 374, at S640, the fieldbus control unit 320 generates an interrupt and, at S650, transmits a pointer of a corresponding address table to the main control unit 310. Accordingly, the main control unit 310 receives the interrupt and the pointer of the address table transmitted to the fieldbus control unit 320, and carries out data processing.

According to the present invention described above, the control and communication functions of a distributed control system can be carried out through a single fieldbus interface board, and all data being transmitted via a network can be collected through the board. As a result, the control and communication operations of the distributed control system can be managed efficiently.

As described above, in accordance with the fieldbus interface board of the present invention, the fieldbus control unit directly manages data being transmitted and received through a fieldbus line, thereby reducing the load of the main control unit. Accordingly, speed of data processing is increased, high-speed communication faster than a communication speed of an existing product is provided, and reliable data processing can be carried out. Additionally, data is separated and controlled according to the order of priority, so all data being transmitted via a network can be collected, thereby allowing the control and communication of a distributed control system to be managed efficiently.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A fieldbus interface board connected with a fieldbus line, the fieldbus interface board comprising:
   a main control unit controlling an overall operation of the board;
   a main memory inputting and outputting data required for the operation of the main control unit, the main memory being controlled by the main control unit;
   a fieldbus control unit controlling transmission and reception of fieldbus data;
   a buffer memory buffering the fieldbus data to be transmitted to the fieldbus line or to be received from the field bus line;
   a fieldbus access unit transmitting the fieldbus data to the fieldbus line or receiving the fieldbus data from the fieldbus line, wherein the fieldbus control unit controls the buffer memory and the fieldbus access unit; and
   wherein the main memory inputs and outputs the fieldbus data according to an order of priority determined under the control of the main control unit, and
   the main memory comprises an emergency data transmission/reception unit queue, a general data transmission/reception unit queue, a time-available data transmission/reception unit queue, an emergency data buffer, a general data buffer, and a time-available data buffer.

2. A fieldbus interface board connected with a fieldbus line, the fieldbus interface board comprising:
   a main control unit controlling an overall operation of the board;
   a fieldbus control unit controlling transmission and reception of fieldbus data independent of direct control of the main control unit;
   a main memory inputting and outputting data required for the operation of the main control unit;
   a buffer memory buffering the fieldbus data exchanged via the fieldbus line; and
   a fieldbus access unit transmitting the fieldbus data to the fieldbus line or receiving the fieldbus data from the fieldbus line, wherein the fieldbus control unit controls the buffer memory and the fieldbus access unit and the main control unit controls the main memory.

* * * * *

UNITED STATES PATENT AND TRADEMARK OFFICE
CERTIFICATE OF CORRECTION

PATENT NO. : 7,054,982 B2 Page 1 of 1
APPLICATION NO. : 10/180300
DATED : May 30, 2006
INVENTOR(S) : In-Ho Choi et al.

It is certified that error appears in the above-identified patent and that said Letters Patent is hereby corrected as shown below:

Column 8, Line 13, Change "field bus" to --fieldbus--.

Signed and Sealed this

Thirtieth Day of January, 2007

JON W. DUDAS
*Director of the United States Patent and Trademark Office*